United States Patent [19]
Hammarskog

[11] Patent Number: 4,643,742
[45] Date of Patent: Feb. 17, 1987

[54] METHOD FOR COOLING GASES AND REMOVING DUST FROM THEM

[75] Inventor: Björn Hammarskog, Sala, Sweden

[73] Assignee: SKF Steel Engineering AB, Hofers, Sweden

[21] Appl. No.: 717,311

[22] Filed: Mar. 28, 1985

[30] Foreign Application Priority Data

Oct. 17, 1984 [SE] Sweden .............................. 8405185

[51] Int. Cl.⁴ .............................................. B01D 47/12
[52] U.S. Cl. ......................................... 55/20; 55/89; 55/94; 55/223; 55/227
[58] Field of Search ................. 55/20, 89, 93, 94, 227, 55/223

[56] References Cited

U.S. PATENT DOCUMENTS

| 3,073,092 | 1/1963 | Ancrum et al. | 55/89 |
| 3,369,344 | 2/1968 | Jackson et al. | 55/20 |
| 3,518,812 | 7/1970 | Kolm | 55/20 |
| 3,541,761 | 11/1970 | Pike | 55/89 |
| 3,782,074 | 1/1974 | Gardenier | 55/20 X |
| 3,984,217 | 10/1976 | Huntington | 55/20 |
| 4,251,236 | 2/1981 | Fattinger et al. | 55/89 X |
| 4,469,493 | 9/1984 | Tuovinen et al. | 55/89 |

FOREIGN PATENT DOCUMENTS 0956245  4/1964  United Kingdom ................... 55/89

Primary Examiner—Charles Hart
Attorney, Agent, or Firm—Armstrong, Nikaido, Marmelstein & Kubovcik

[57] ABSTRACT

The invention relates to a method and a plant for cooling gases and removing dust from them. In a first step after saturation with water vapour, the gas is brought to accelerate, additional water being simultaneously added to the dust particles in the gas, whereupon the gas flow thus loaded is brought to pass over the surface of the water in a first sedimentation container (1) so that the majority of the dust content is released to the sump in the sedimentation container (1). The gas flow is thereafter subjected to final cleaning and cooling in a second step, through direct contact with water, whereupon the water utilized in this manner, possibly via a second sedimentation container (2), is wholly or partially returned to the first step.

5 Claims, 1 Drawing Figure

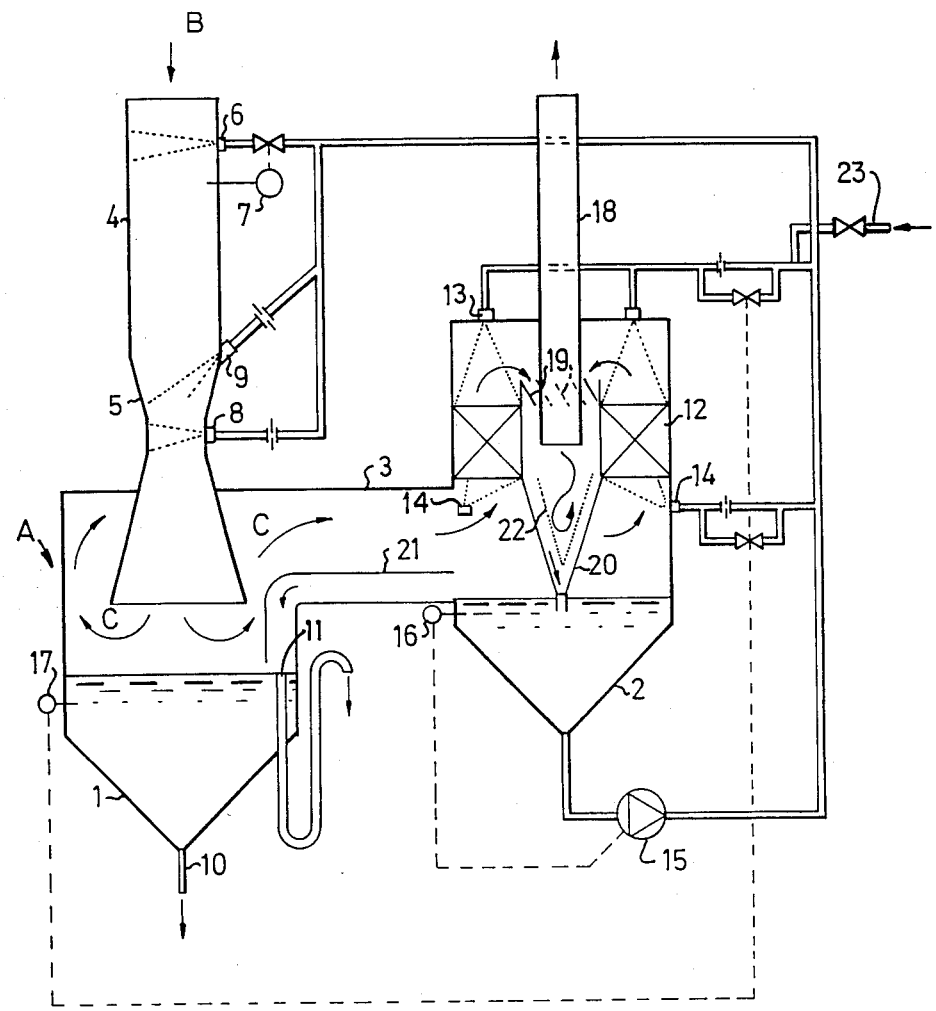

METHOD FOR COOLING GASES AND REMOVING DUST FROM THEM

DESCRIPTION

The present invention relates to a method for cooling gases and removing dust from them, and can advantageously be used for cooling and cleaning gases used in the metallurgical industry, for instance, for reducing metal oxides by means of recirculation and/or which are expelled from such processes and contain large quantities of dust as well, frequently, as water vapour. Such gases are usually also hot.

To avoid clogging and wear problems in the pipes, fans and other equipment, caused by the dust-containing gas and also by condensation in such gas cleaning plants, demands on the cleaning equipment and cooling means for such processes are high. These demands have become even stricter due to recent environmental legislation which, as is known, greatly restricts the emission of such gases from the process industry into the atmosphere.

In the cleaning methods used hitherto, high speeds are often used in nozzles and other arrangements designed to mix the dust content in gases with water, the extra water being added to remove the dust from the gas. Since the dust is generally extremely abrasive, wear on the components in known cleaning equipment is considerable and the energy consumption is high. Furthermore, methods used hitherto are not very efficient in removing submicronous particles (less than 1/1000 mm) from the gas and, as is known, such particles are often present in these gases.

Furthermore, cleaning and cooling of the gas are generally performed in separate steps, entailing the use of vast quantities of water which is polluted due to contact with the dust in the gas. Such vast quantities of water also produce a low temperature in the waste water which makes heat recovery more difficult and also requires subsequent use of complicated equipment to remove the dust collected in the water in the gas scrubber.

The object of the present invention is, in an integrated apparatus, to clean and cool such gases while using the least possible quantity of water and utilizing low gas and water speeds in order to reduce the wear and consumption of energy mentioned above. The reduced water consumption also results in a higher temperature in the waste water, thus enabling or facilitating heat recovery, as well as enabling smaller, and thus less expensive equipment to be used for subsequent removal of the dust from the water.

This is achieved according to the invention in the method described in the introduction substantially in that in a first step after saturation with water vapour the gas is brought to accelerate, additional water being simultaneously added to the dust particles in the gas so that a high relative speed between dust particles and water drops is achieved and the temperature of the water is reduced below that of the gas in order to effect a desired separation of submicronous particles by water vapour being caused to condense on the water drops, whereupon the gas flow thus loaded is brought to pass over the surface of the water in a first sedimentation container so that the majority of the dust content is released to the sump in the sedimentation container, whereupon the gas flow is subjected to final cleaning and cooling in a second step, through direct contact with water, whereupon the water utilized in this manner, possibly via a second sedimentation container, is wholly or partially returned to the first step.

Thus in the method according to the invention, the hot gas is conditioned in a first step by the addition of water, whereupon the gas is cooled to generally about 100° C. and saturated with the water vapour thus generated. The gas conditioned in this way is then accelerated, suitably in a venturi zone, while being simultaneously loaded with respect to the dust content of the gas, by the addition of water having a temperature below that of the gas. This loading occurs partly due to collision between dust particles and water drops, achieved by a high relative speed between the dust particles flowing axially in the gas and the radially injected water drops, and partly due to condensation of water vapour in the gas on the cooler water drops, whereupon submicronous particles are drawn to and absorbed by the water drops.

Thus, according to the invention, a substantial reduction in the amount of water required for cleaning and cooling is achieved, as well as a higher temperature in the waste water withdrawn from the first sedimentation container than is the case in earlier cleaning processes. Heat recovery is thus enabled or considerably facilitated. This effect can be further improved by the recirculation of the water from the second sedimentation container proposed according to the invention.

According to a suitable embodiment of the invention, the gas acceleration in the first cleaning step is achieved in a venturi zone, the water being injected radially in the venturi throat.

The temperature of the water withdrawn via the surface outlet in the first sedimentation container is suitably controlled via a temperature regulator arranged in the water sump of the first sedimentation container, said regulator being arranged to control the water flow re-circulated in the second sedimentation container and the water flow supplied externally to the second sedimentation container.

According to another embodiment of the invention the dust-containing water in the first sedimentation-container sump is separated from the cleaner water in the second sedimentation-container sump by the water level of the second sedimentation container being located above the water level in the first sedimentation container.

According to the invention, the second sedimentation container is suitably protected against overfilling by a part-flow of the surface water being caused to flow from the second sedimentation container to the first sedimentation container, whereupon any material floating on the surface of the water also passes to the first sedimentation container via a spillway.

According to a suitable embodiment the cooled and cleaned gas is demoisturized by passage through a cyclone arranged in the second sedimentation container, the water separated off being supplied directly to the sump in the bottom of the second sedimentation container.

The invention also relates to a plant for cooling gases and removing dust from them, for performing the method according to the invention, and this plant comprises a substantially closed treating unit composed of a gas inlet, a gas outlet, a gas-flow space therebetween and a first sedimentation container partially filled with water, arranged below the gas inlet, as well as a second sedimentation container partially filled with water, arranged at a distance—seen in the direction of flow of the gas—from said first sedimentation container.

According to the invention the gas inlet is provided with a venturi zone to accelerate the gas flow, water supply means with their orifices in the gas inlet being arranged to inject water drops radially into the gas flow across the cross section of the venturi zone.

To avoid clogging of the venturi zone, furthermore, according to the invention one or more water supply nozzles may be arranged to provide a substantially tangential supply of water, directed along the inner wall of the venturi inlet.

According to a suitable embodiment of the invention both the first and the second sedimentation containers narrow conically towards a bottom outlet.

According to a suitable embodiment of the invention the water level in the second sedimentation container is located at a higher level than that in the first sedimentation container, a spillway also being arranged between said second and first sedimentation containers. The spillway is preferably separated from the flow of gas in the gas-flow space by a partition.

According to the invention gas scrubbers are also arranged in conjunction with the second cleaning step, at the gas outlet. A spray tower may be used for this purpose, for instance, having a number of nozzles for supplying water to the gas flow, or a cooling bed arranged substantially above the second sedimentation container, said cooling bed containing solid filler bodies and arranged to cooperate with water supply nozzles above the cooling bed.

According to the invention a turbulence zone is arranged after the cooling bed in the direction of flow of the gas.

The lower part of the gas outlet suitably continues into a conically narrowing extension with its orifice below the water level in the second sedimentation container, for transporting cooling water to the second sedimentation container. This extension also serves as water-lock and may suitably be provided with a conical insert.

Other features of the invention will be revealed in the accompanying claims.

The invention will be described more fully with reference to one embodiment shown in the drawing.

The plant shown in the drawing comprises in principle a substantially closed treating unit A containing at least two substantially vertical cylindrical containers, i.e. a first sedimentation container 1 and a second sedimentation container 2. The containers 1 and 2 are connected by means of a gas-flow space 3. The containers are also partially filled with water. The two sedimentation containers 1, 2 are so located in relation to each other that the surface of the water in the first sedimentation container 1 is always below the surface of the water in the second sedimentation container 2—during normal operation conditions—and so that the gas-flow space 3 is located on a level with the surface of the water in the second sedimentation container 2.

A gas inlet 4 is provided in the gas-flow space 3 above the first sedimentation container 1, said inlet being provided with a venturi zone 5 immediately prior to entering the flow space 3. One or more nozzles supply water into the gas inlet 4 above the venturi zone, the supply of water being regulated by means of a temperature regulator 7. One or more nozzles 8 supply water in the venturi zone 5 in the form of water drops injected radially across the cross section of the venturi throat. The object of this is to achieve the greatest possible difference in speed between the axially flowing dust particles in the gas and the radially injected water drops. Besides this, one or more nozzles 9 supply water tangentially along the inner wall of the venturi inlet.

Both the first and the second sedimentation containers 1 and 2, respectively, narrow conically to a bottom outlet 10. The first sedimentation container is also provided with a spillway 11.

In the extension of the flow space, i.e. above the second sedimentation container 2, is a gas outlet 18. Before the finally cooled and cleaned gas reaches the gas outlet 18 it is caused to pass a bed 12 packed with solid bodies, cooling water being supplied to this bed from above, i.e. in counter-flow to the flow of gas, through one or more nozzles 13. The water may also be supplied to the bed 12 from below, through nozzles 14, and in this case the water withdrawn by a pump 15 from the bottom of the second sedimentation container 2 may suitably be used. The pump cooperates with a level regulator 16. The temperature of the water supplied through nozzles 13 and 14 can be regulated via a temperature control means 17 initiated by the surface water in the sump of the first sedimentation container.

A cyclone is provided for final demoisturizing of the cooled and cleaned gas, connected to the gas outlet 18. Here the gas is caused to rotate by means of inclined blades 19. The water collected here is suitably returned to the water sump of the second sedimentation container via an extension 20 narrowing conically into the surface of the water in said container 2. To further improve the drop separation this extension may be provided with an insert 22. The extension 20 also constitutes a gas or water lock.

Finally, to prevent undesired influence on the overflow from the second sedimentation container 2 to the first sedimentation container 1 located below it, a protective metal sheet 21 is provided for this spillway.

The plant shown in the drawing functions in principle as follows:

The hot gas to be cleaned and cooled is introduced through the gas inlet 4 in the direction of the arrow B. Water is supplied to the hot gas flow through nozzles 6 whereupon some of the water is vaporized upon coming into contact with the hot gas, which is thus saturated with water vapour at the desired temperature, normally below 100° C.

The quantity of water supplied through the nozzles 6 is controlled by the temperature regulator 7 and the water withdrawn from the bottom of the second sedimentation container 2 is suitably used for this water supply. The gas thus saturated with water vapour then flows through the venturi zone 5 where more water is added through one or more nozzles 8. The water is supplied here in the form of drops which are injected radially over the cross section of the venturi throat, giving the maximum difference in speed between the axially flowing dust particles in the gas and the radially injected water drops. Here too the water withdrawn from the lower part of the sedimentation container 2 is used.

To avoid clogging the venturi zone 5 water is also supplied tangentially along the inner wall of the venturi inlet through one or more nozzles 9 and these too may be supplied with water from the bottom of the second sedimentation container 2.

At its exit from the venturi zone 5 and entry into the gas-flow space 3, the gas is deflected against the surface of the sump water in the first sedimentation container 1 and flows upwardly—see the arrows C—along the walls of the first sedimentation container 1 and on through the flow space 3 towards the outlet 18. The heavier dust particles in the gas, whose mass has been further increased by contact with water in the venturi zone, come into contact with the surface of the water in the first sedimentation container 1 and for the most part sink to the bottom of the sump.

Thus most of the dust in the gas flow will leave the sedimentation container 1 together with a small quantity of water, through the outlet 10 arranged at the bottom of the container, whereas most of the water containing a small quantity of dustlike particles will leave the container 1 through the upper pipe 11 serving as a spillway. With a low gas pressure in the container 1, this pipe may suitably be in the form of a water lock in order to protect the container 1 against over-pressure, whereas in the case of high gas pressure, this protection is obtained by means of a safety valve and tapping is effected by a level-regulated pump, for instance. The spillway 11 is preferably placed so that any material floating on the surface of the water is carried to the spillway by the flowing gas.

The gas thus cleaned in a first step now flows on to a second cleaning step and is here caused to flow up through the flow space through the bed 12 packed with solid bodies where it is subjected to final cooling and cleaning by direct contact with water. This cooling water is primarily supplied to the bed from above through one or more nozzles 13.

Cooling water may possibly be supplied by means of recirculation from the sump at the bottom of the container 2 from above and/or below through one or more nozzles 14.

The cooling water used here, together with condensation from the finally cooled gas, flows down into the sump at the bottom of the container 2 and the water collected here thus contains only a small portion of dust particles. It can therefore be recirculated by means of the pump 15 and re-used in the process. To enable a constant level to be maintained in the sump in the sedimentation container 2, a level regulator is arranged to cooperate with nozzles 14 and/or 6, 8 and 9.

If necessary, the water temperature in the container 2 can be increased by recirculating it to the packed bed.

When recovering heat from the surface water in the first sedimentation container, the temperature of the drainage water is preferably controlled by a temperature regulator 17 which controls the degree of recirculation in the second container. The temperature regulator 17 is suitably located in the sump of the first container 1 and prevents the set temperature of the water being exceeded by the addition of an excess of external cooling water supplied from inlet 23 through the nozzles 13.

A small portion of the surface water in the sump of container 2 flows along the lower limit of the space 3 to the container 1, and this water flow is preferably separated from the gas flow by a partition 21. This arrangement protects the gas scrubber from overfilling and removes any particles floating on the surface of the water.

The cooled and cleaned gas is thereafter caused to flow out through outlet 18. If necessary it is further demoisturized by rotation in a cyclone connected to the outlet 18. The gas is caused to rotate by means of inclined blades 19. To facilitate separation of the water from the cyclone, the lower part may be provided with a conical sheet 22 provided with perforations or slits.

The dewpoint of the cleaned gas leaving the plant can be regulated if necessary, generally within a range of 10°–50° C., by controlling the temperature of the water injected through nozzles 13.

The invention is not limited to the embodiment shown in the drawing. It may be varied in many ways within the scope of the following claims.

We claim:

1. A method of cooling and cleaning a gas which contains dust particles comprising:
    (a) saturating the gas with water vapor;
    (b) accelerating the gas that has been saturated with water vapor while injecting water into the gas to achieve a high relative velocity between the dust particles and the water, the temperature of the water injected into the gas being lower than the temperature of the gas such that water vapor in the gas condenses and causes separation of submicron dust particles;
    (c) passing the gas from step (b) over the surface of water in a first sedimentation zone having a water sump and a temperature regulator in said sump to cause a major portion of the dust particles to be removed from the gas and collected in said first sedimentation zone;
    (d) further cleaning and cooling the gas from step (c) by contacting the gas directly with water;
    (e) recirculating at least a portion of the water used in step (d) through a second sedimentation zone to steps (a) and (b) while supplying water externally to said second sedimentation zone; and
    (f) controlling the water withdrawn from the surface of said first sedimentation zone, the water recirculated in said second sedimentation zone and the water supplied externally to the second sedimentation zone with said temperature regulator.

2. The method according to claim 1, wherein the gas is accelerated in step (b) within a venturi zone while radially injecting water into the gas in the venturi throat.

3. The method according to claim 1, wherein said second sedimentation zone is separated from said first sedimentation zone by a gas flow space and the level of said second sedimentation zone is above the level of said first sedimentation zone.

4. The method according to claim 1, wherein water from said second sedimentation zone is caused to flow to said first sedimentation zone via a spillway.

5. The method according to claim 1, wherein the gas from step (d) is passed through a cyclone arranged in the second sedimentation zone to demoisturize the gas and water separated from the gas is supplied directly to a sump in the bottom of the second sedimentation zone.

* * * * *